United States Patent
Jacobson et al.

(10) Patent No.: US 10,448,653 B2
(45) Date of Patent: *Oct. 22, 2019

(54) MULTI-LAYERED FOOD PRODUCT AND METHOD FOR FORMING

(75) Inventors: Peter Jacobson, Cleveland Heights, OH (US); Marc de Longree, Genval (BE)

(73) Assignee: Arlington Valley Farms LLC, Cleveland, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 13/419,505

(22) Filed: Mar. 14, 2012

(65) Prior Publication Data

US 2012/0231120 A1    Sep. 13, 2012

Related U.S. Application Data

(63) Continuation-in-part of application No. 12/958,313, filed on Dec. 1, 2010.

(60) Provisional application No. 61/265,457, filed on Dec. 1, 2009.

(51) Int. Cl.
| | |
|---|---|
| *A21D 13/31* | (2017.01) |
| *A21D 8/06* | (2006.01) |
| *A21D 13/24* | (2017.01) |
| *A21D 13/32* | (2017.01) |
| *A21D 13/14* | (2017.01) |
| *A21D 13/22* | (2017.01) |

(52) U.S. Cl.
CPC .............. *A21D 13/31* (2017.01); *A21D 8/06* (2013.01); *A21D 13/14* (2017.01); *A21D 13/22* (2017.01); *A21D 13/24* (2017.01); *A21D 13/32* (2017.01)

(58) Field of Classification Search
CPC ............ A21D 13/0022; A21D 13/0019; A21D 13/0045; A21D 13/0048; A21D 13/0051; A21D 13/0054; A21D 13/0003; A21D 10/00; A21D 10/04; A23L 1/0047; A23L 1/005; A23L 1/0064; A23L 1/004767; A23L 1/007

USPC ........................................................ 426/304

See application file for complete search history.

(56) References Cited

U.S. PATENT DOCUMENTS

| | | | |
|---|---|---|---|
| 3,250,625 A | 5/1966 | Thelen | |
| 4,517,203 A | 5/1985 | Levine et al. | |
| 4,877,629 A | 10/1989 | Stypula | |
| 4,948,603 A | 8/1990 | Bemacchi et al. | |
| 5,194,271 A | 3/1993 | Yasosky | |
| 5,520,937 A * | 5/1996 | Yasosky et al. | 426/94 |
| 5,614,240 A | 3/1997 | Young | |

(Continued)

FOREIGN PATENT DOCUMENTS

| | | |
|---|---|---|
| EP | 0540521 | 3/1995 |
| EP | 0683982 | 11/1995 |
| WO | WO-2005/112664 A1 | 12/2005 |

OTHER PUBLICATIONS

Final Office Action for U.S. Appl. No. 12/958,313 dated Feb. 17, 2016, 23 pages.

(Continued)

*Primary Examiner* — Erik Kashnikow
*Assistant Examiner* — Lela S. Williams
(74) *Attorney, Agent, or Firm* — Fay Sharpe LLP

(57) ABSTRACT

A multi-layered food product comprises a filling encapsulated by a substantially baked yeast-leavened dough. The encapsulated filling is further encapsulated by a substantially baked chemically-leavened batter layer.

17 Claims, 9 Drawing Sheets

(56) References Cited

U.S. PATENT DOCUMENTS

| | | |
|---|---|---|
| 5,955,129 A | 9/1999 | Haas, Sr. et al. |
| 6,013,300 A | 1/2000 | Reichkitzer et al. |
| 6,265,005 B1 | 7/2001 | Haverkos et al. |
| 6,511,691 B1 | 1/2003 | Willoughby et al. |
| 6,623,778 B2 | 9/2003 | Kershman et al. |
| 2002/0068115 A1 | 6/2002 | Hayes-Jacobson |
| 2002/0094366 A1 | 7/2002 | Kershman et al. |
| 2004/0018287 A1 | 1/2004 | Kershman et al. |
| 2004/0081934 A1 | 4/2004 | Haas et al. |
| 2004/0219271 A1 | 11/2004 | Belknap et al. |
| 2005/0025862 A1* | 2/2005 | Morad et al. .................. 426/94 |
| 2005/0048182 A1 | 3/2005 | King et al. |
| 2006/0073246 A1 | 4/2006 | Valenzky et al. |
| 2006/0121160 A1 | 6/2006 | Preppernau et al. |
| 2008/0057257 A2 | 3/2008 | Almeida et al. |
| 2008/0248168 A1 | 10/2008 | Black |
| 2009/0081347 A1 | 3/2009 | Gambino |
| 2011/0135792 A1 | 6/2011 | Jacobson |

OTHER PUBLICATIONS

Sharon Lauterbach, et al. "NF94-186 Functions of Baking Ingredients", Historical Materials from University of Nebraska-Lincoln Extension, paper 411, 1994, 6 pages.

* cited by examiner

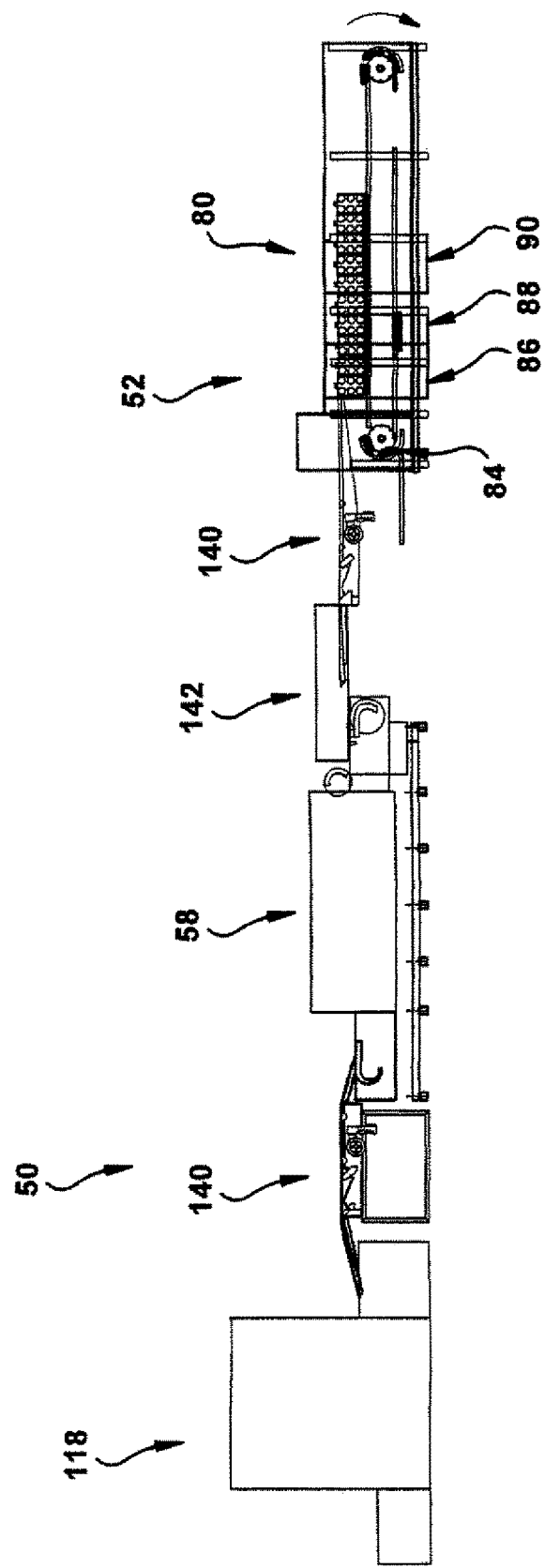

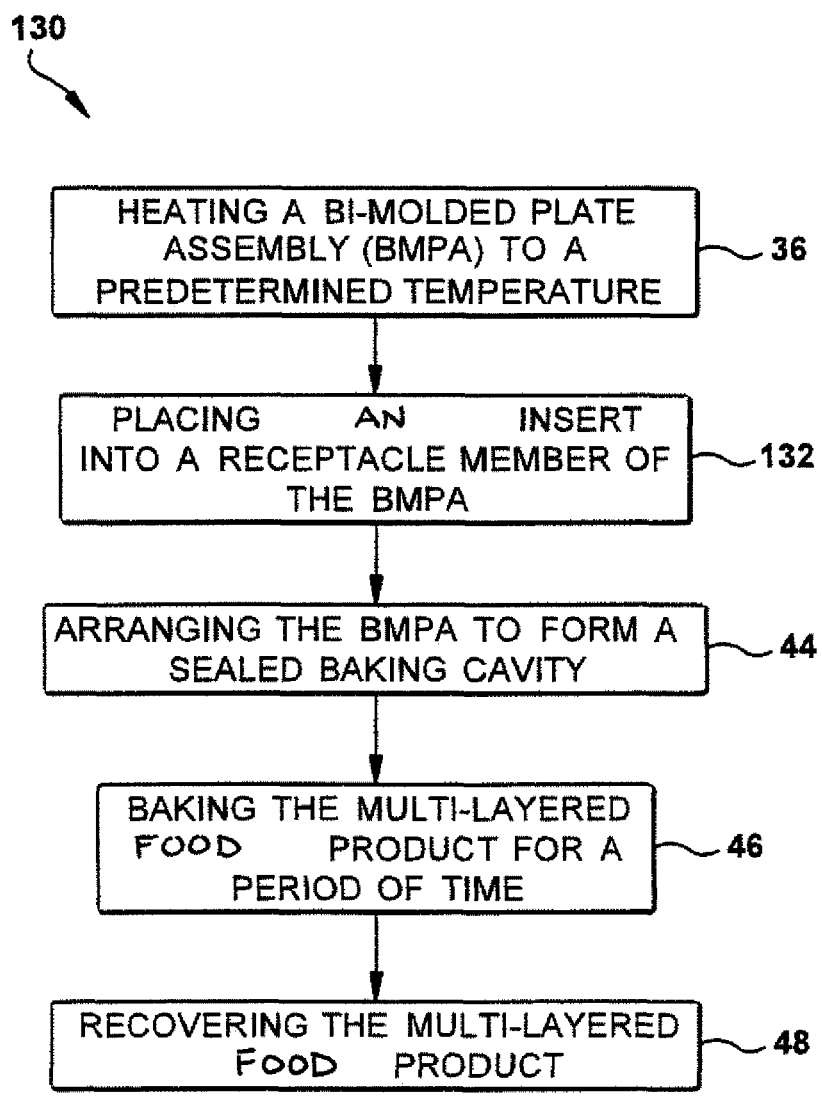

MULTI-LAYERED FOOD PRODUCT AND METHOD FOR FORMING

RELATED APPLICATIONS

This application is a continuation-in-part of U.S. patent application Ser. No. 12/958,313, filed Dec. 1, 2010, which claims priority from U.S. Provisional Application Ser. No. 61/265,457, filed Dec. 1, 2009. The entirety of each of the aforementioned applications is hereby incorporated by reference.

TECHNICAL FIELD

The claimed subject matter relates generally to filled food products, and more particularly to a multi-layered food product and method for forming the multi-layered food product.

BACKGROUND OF THE INVENTION

Demand for convenience food has steadily increased in recent years. As people look to find ways to maximize free time, ready-made meals and snack products have become increasingly popular with consumers. Most households now have a microwave oven to assist in the rapid heating of food. Accordingly, a large number of ready-made meals and snacks have been developed which can be heated in a microwave oven.

While these types of snacks and meals can be quickly heated in a microwave oven, the types of meals and snacks that are suitable for heating in such ovens are, to some extent, limited. For example, snacks of a type which have a filling surrounded by a crispy coating typically cannot be satisfactorily prepared in a microwave oven. This is because steam, generated during the heating process by evaporation of water from the filling, is deleterious to organoleptic qualities of the coating. Steam penetrates the outer coating rendering it moist, soggy and unappetizing. Such crispy-coated products are typically best prepared by heating in a conventional oven, or frying in oil to maintain crispness. This considerably lengthens the time required to prepare such snacks, thus making them far less convenient to prepare.

SUMMARY OF THE INVENTION

According to one aspect of the claimed subject matter, a multi-layered food product comprises a filling encapsulated by a substantially baked yeast-leavened dough. The encapsulated filling is further encapsulated by a substantially baked chemically-leavened batter layer.

According to another aspect of the claimed subject matter, a method is provided for forming a multi-layered food product. One act of the method includes substantially baking an insert in a first bi-molded plate assembly. The insert comprises a filling that is completely enveloped by a yeast-leavened dough. Next, the substantially baked insert is placed into a second bi-molded plate assembly so that the substantially baked insert is located atop a first amount of a chemically-leavened batter layer. A second amount of the chemically-leavened batter is then poured into the second bi-molded plate assembly so that the second amount of the chemically-leavened batter substantially or completely envelops the substantially baked insert. The second bi-molded plate assembly is heated for a time and at a temperature sufficient to bake the multi-layered food product.

BRIEF DESCRIPTION OF THE DRAWINGS

The foregoing and other features of the claimed subject matter will become apparent upon reading the following description with reference to the accompanying drawings, in which:

FIG. 6 is a schematic diagram showing an alternative configuration of the automated assembly line system in FIG. 5;

FIG. 11 is a process flow diagram illustrating a further aspect of the method shown in FIG. 4;

FIG. 12 is a process flow diagram illustrating a method for forming a multi-layered food product according to another aspect of the claimed subject matter.

DETAILED DESCRIPTION

The claimed subject matter relates generally to filled food products, and more particularly to a multi-layered food product and method for forming the multi-layered food product. As representative of one aspect of the claimed subject matter, FIGS. 1A-2D illustrates a multi-layered food product 10 or 10' that combines the strength and functionality of yeast-leavened bread with the delicate eating quality of a quick bread or cake. Unlike conventional filled food products, the multi-layered food product 10 or 10' of the claimed subject matter combines a yeast-leavened dough insert 12 or 12', which provides structural integrity to the product to facilitate eating by hand, with a chemically-leavened batter 14 that gives the product a soft and appealing eating quality, which is absent in purely yeast-leavened bread products. Additionally, the multi-layered food product 10 or 10' can be initially warmed in a microwave and then reconstituted in an oven or toaster to yield a food product having a crispy exterior and a soft interior without the chewy or tough consistency of a typical yeast-leavened bread product.

The multi-layered food product 10 or 10' has a molded configuration (e.g., puck-shaped) and a partially uniform color. Although a puck-shaped configuration is shown, the multi-layered food product 10 or 10' can have other shapes, such as rectangular, circular, ovoid, square, triangular, cylindrical, star-shaped, or any other polygonal shape. The partially uniform color gives the multi-layered food product 10 or 10' the appearance of a home-baked meal or snack that has been prepared on a griddle, pan or Panini. Although the multi-layered food product 10 or 10' is shown as having a puck-shaped configuration, it will be appreciated that the product can have any desirable shape and size that makes the product versatile and easy to consume. For example, the multi-layered food product 10 or 10' can have any shape and size that enables a consumer to easily eat the multi-layered food product at home or on-the-go without any mess. The molded configuration of the multi-layered food product 10 or 10' also allows the product to be quickly and easily reconstituted for consumption in a microwave and/or toaster, or simply by oven.

Figure 1A:
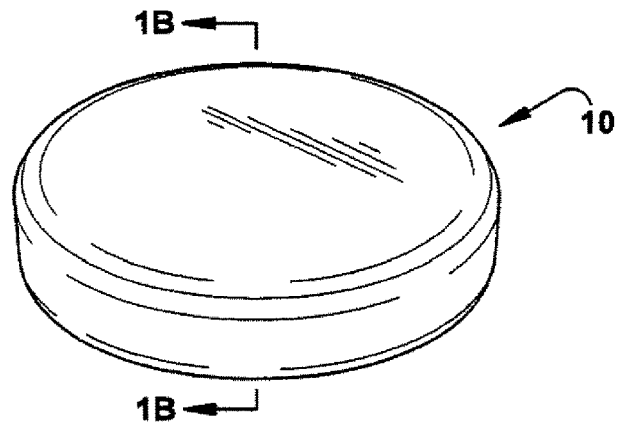
FIG. 1A is a perspective view of a multi-layered food product in accordance with one aspect of the claimed subject matter.
Figure 1B:
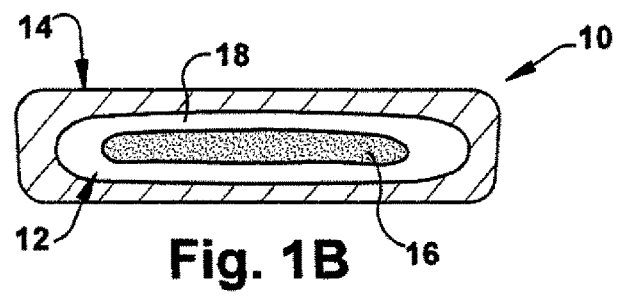
FIG. 1B is a cross-sectional view taken along Line 1B-1B in FIG. 1A.

As shown in FIG. 1B, the multi-layered food product 10 comprises a substantially baked insert 12 or 12' that includes a filling 16, which is substantially (e.g., more than 50%, about 60%, about 70%, about 80% or about 90%) or completely enveloped or encapsulated by a yeast-leavened dough 18. The substantially baked insert 12 or 12' is substantially or completely enveloped or encapsulated by a chemically-leavened batter layer 14. The substantially baked insert 12 or 12' has a molded configuration (e.g., a puck-like shape). As noted above, the substantially baked insert 12 or 12' additionally includes a filling 16 that is substantially or completely enveloped or encapsulated by the yeast-leavened dough 18. The filling 16 can comprise any desired solid or semi-solid food product that is typically included as part of a meal or snack. Examples of fillings 16 can include fruit, cheese, eggs, meat (e.g., ham, bacon, sausage, hamburger, chicken, turkey, etc.), vegetables, sauces, and/or a combination thereof.

The multi-layered food product 10 or 10' combines the distinctive structural and taste characteristics of yeast- and chemically-leavened breads into a single food product. Yeast-leavened breads use fermentation to create carbon dioxide "bubbles" and thereby leaven the dough. Fermentation begins by mixing the ingredients together to develop a strong gluten structure, which allows the dough to accumulate carbon dioxide. Leavening continues to occur in the proofing stage, in which a low heat and high humidity environment promotes optimal yeast fermentation. Yeast leavening is highly regarded as contributing desirable tastes and aromas to bread. For example, yeast-leavened breads tend to have a smooth outer crust and airy, flaky interiors.

Chemically-leavened breads, also known as "quick breads", are formed by the reaction of bicarbonate compounds with acid-reactive ingredients. Sodium bicarbonate is the most commonly used chemical leavening agent, but potassium and ammonium bicarbonates are also used. Chemical leavening typically occurs in two stages. The first stage releases carbon dioxide during mixing, while the second stage releases carbon dioxide during the baking process by the activation of certain chemical leavening ingredients. One advantage of chemical leavening is the quick formation of carbon dioxide bubbles within a dough or batter mixture, without the need for proofing. Unlike yeast-leavened breads, quick breads are known for having a slightly coarse texture and soft crusts.

The weight-percent (wt-%) of the chemically-leavened batter 14, the filling 16, and the yeast-leavened dough 18 can be varied to impart the multi-layered food product 10 or 10' with desired structural and taste characteristics. In one example of the present invention, the wt-% of the filling 16 can be about 15% to about 60% of the total weight of the multi-layered food product 10 or 10', the wt-% of the yeast-leavened dough 18 can be about 10% to about 60% of the total weight of the multi-layered food product, and the wt-% of the chemically-leavened batter layer 14 can be about 15% to about 60% of the total weight of the multi-layered food product.

The leavening agents and/or other ingredients used to form the chemically-leavened batter layer 14 and the yeast-leavened dough 18 can also be varied depending upon the particular structural and taste characteristics of the multi-layered food product 10 or 10'. For example, the wt-% of yeast to flour in the yeast-leavened dough 18 can be about 1% to about 6%. Additionally, one or a combination of chemical leavening agents (e.g., baking powder) can be used to form the chemically-leavened batter layer 14. For example, the wt-% of the chemical leavening agent (e.g., baking powder) to flour in the chemically-leavened batter layer 14 can be about 0% to about 8%.

FIGS. 2A-D illustrate a multi-layered food product 10' according to another aspect of the claimed subject matter. The multi-layered food product 10' can have a molded configuration (e.g., puck-shaped) and a partially uniform color. Although the multi-layered food product 10' is shown as having a puck-shaped configuration, it will be appreciated that the product can have any desirable shape and size that makes the product versatile and easy to consume.

Figure 2A:
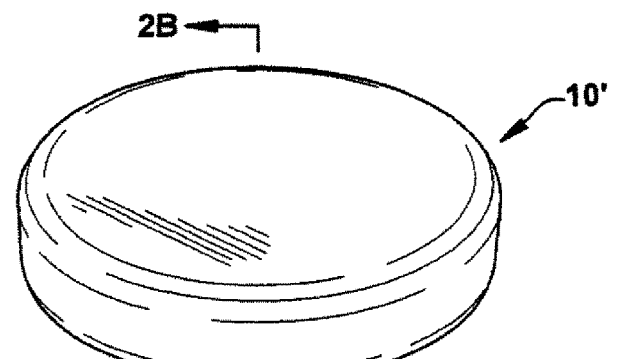
FIG. 2A is a perspective view of a multi-layered food product in accordance with another aspect of the claimed subject matter.
Figure 2B:
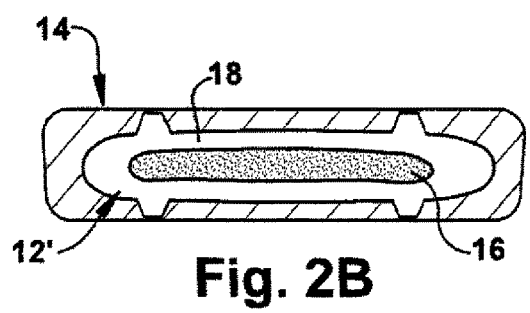
FIG. 2B is a cross-sectional view taken along Line 2B-2B in FIG. 2A.
Figure 2C:
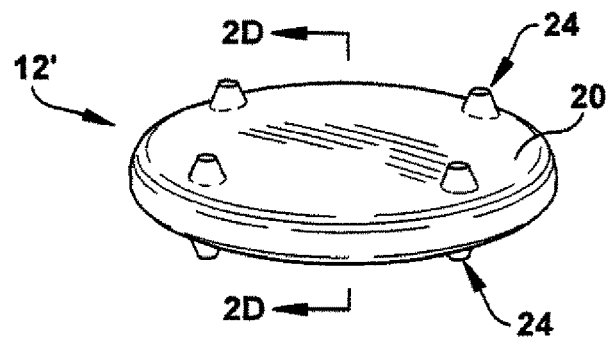
FIG. 2C is a perspective view of a substantially baked insert comprising a portion of the multi-layered food product in FIGS. 2A-B.
Figure 2D:
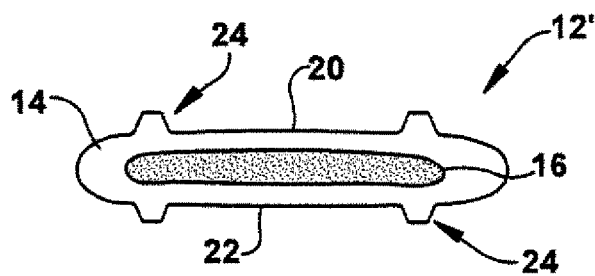
FIG. 2D is a cross-sectional view taken along Line 2D-2D in FIG. 2C.

As shown in FIGS. 2A-D, the substantially baked insert 12' has a molded configuration and is defined by oppositely disposed first and second major surfaces 20 and 22. At least one of the first and second major surfaces 20 and 22 can include a finger member 24 that projects outwardly from at least one of the first and second major surfaces. As shown in FIG. 2C, for example, each of the first and second major surfaces 20 and 22 can include a plurality of finger members 24. The finger members 24 generally serve to secure the substantially baked insert 12' within the chemically-leavened batter layer 14 and prevent the insert from "sinking" to either side of the multi-layered food product 10'. It should be appreciated that, where desired, the first and/or second major surfaces 20 and 22 may not include any finger members 24.

The finger members 24 are formed from the yeast-leavened dough 18 and are dispersed about the first and second major surfaces 20 and 22. The finger members 24 can be dimensioned (e.g., have a sufficient height, width, and thickness) to keep the substantially baked insert 12' from sinking to either side of the multi-layered food product 10'. The finger members 24 may or may not be visible about the multi-layered food product 10'. The finger members 24 can be symmetrically or asymmetrically dispersed about the first major surface 20 and/or the second major surface 22. The finger members 24 can have any desired shape or configuration, such as the dome-shaped configuration shown in FIG. 2C. Although not shown, it will be appreciated that one or more of the finger members 24 can alternatively have a ridge-like configuration that extends across all or only a portion of the first major surface 20 and/or the second major surface 22.

Figure 3A:
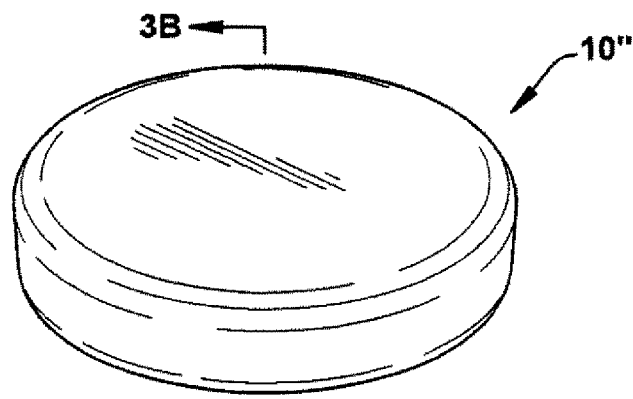
FIG. 3A is a perspective view of a multi-layered food product in accordance with another aspect of the claimed subject matter.
Figure 3B:
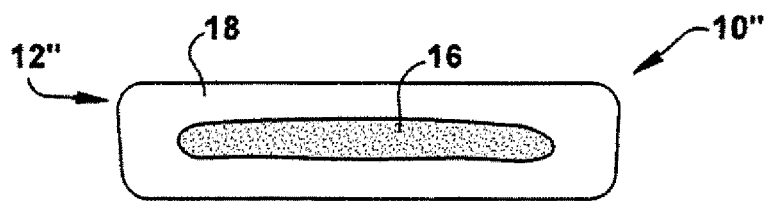
FIG. 3B is a cross-sectional view taken along Line 3B-3B in FIG. 3A.
Figure 4:
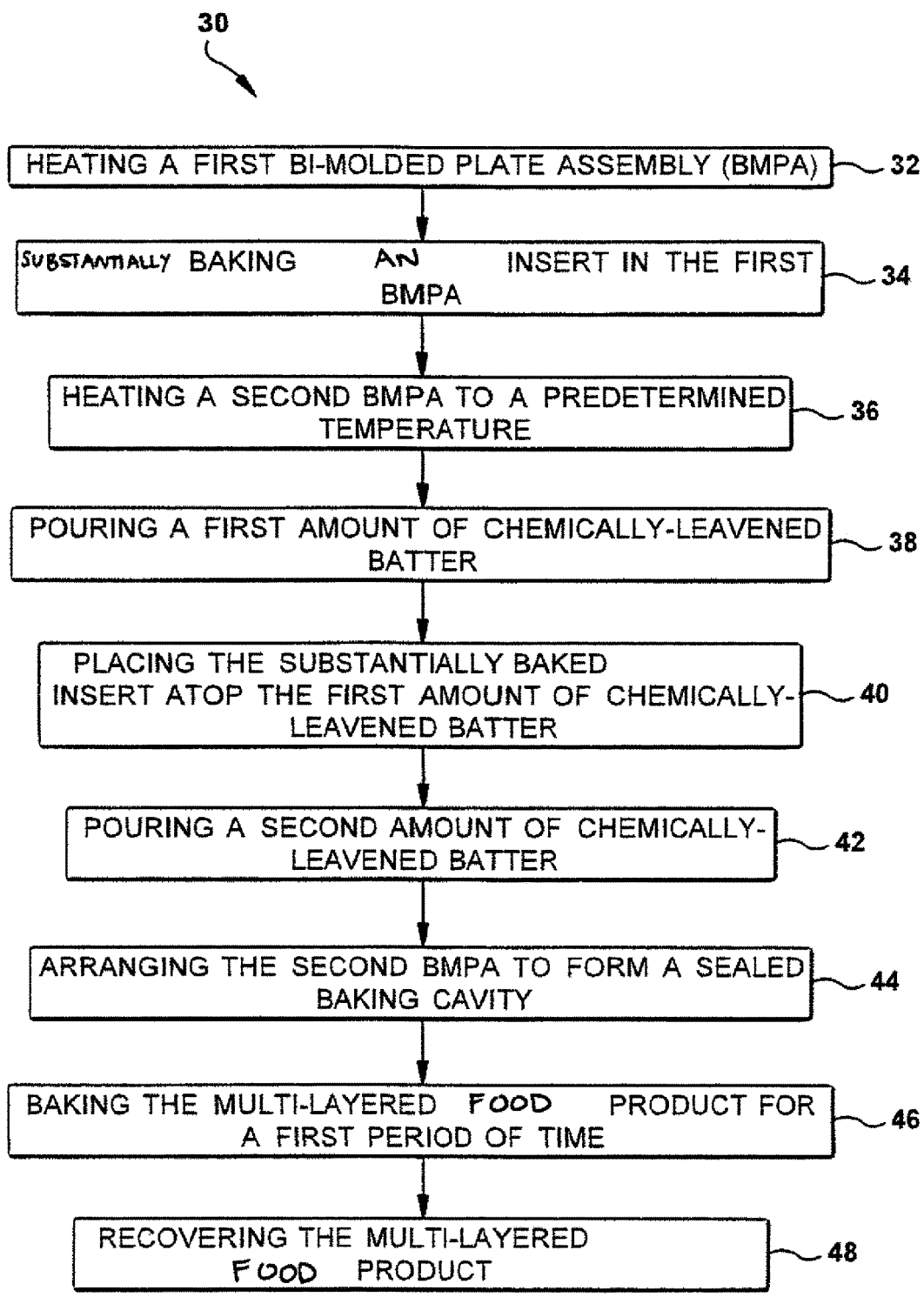
FIG. 4 is a process flow diagram illustrating a method for forming a multi-layered food product according to another aspect of the claimed subject matter.

FIGS. 3A-B illustrate a multi-layered food product 10" according to another aspect of the claimed subject matter. The multi-layered food product 10" can have a molded configuration (e.g., puck-shaped) and a partially uniform color. Although the multi-layered food product 10" is shown as having a puck-shaped configuration, it will be appreciated that the product can have any desirable shape and size that makes the product versatile and easy to consume. For example, the multi-layered food product 10" can have any shape and size that enables a consumer to easily eat the multi-layered food product at home or on-the-go without any mess. The molded configuration of the multi-layered food product 10" also allows the product to be quickly and easily reconstituted for consumption in a microwave and/or toaster, or simply an oven.

As shown in FIG. 3B, the multi-layered food product 10" can comprise a insert 12" including a filling 16 that is substantially or completely enveloped or encapsulated by a yeast-leavened dough 18. As described above, the filling 16 can include any desired solid or semi-solid food product that is typically included as part of a meal (e.g., fruit, cheese, eggs, meat, vegetables, sauces, and/or a combination thereof) or snack.

The weight-percent (wt-%) of the filling 16 and the yeast-leavened dough 18 can be varied to impart the multi-layered food product 10" with desired structural and taste characteristics. In one example of the present invention, the wt-% of the filling 16 can be about 25% to about 75% of the total weight of the multi-layered food product 10", and the wt-% of the yeast-leavened dough 18 can be about 25% to about 75% of the total weight of the multi-layered food product.

As illustrated in FIGS. 4-6 and 13, another aspect of the claimed subject matter includes a method 30 for forming a multi-layered food product 10 or 10'. The method 30 can be performed using an automated assembly line system (FIGS. 5-6 and 13) comprising first and second automated assembly lines 50 and 52 (and 206). The first automated assembly line 50 is for preparing the substantially baked insert 12 or 12' and comprises a series of upper and lower loop-shaped tracts 54 and 56, a portion of each of which is disposed within an oven 58. The upper and lower tracts 54 and 56 of the first automated assembly line 50 include a plurality of first baking plates 60 securely mounted thereto that can be securely mated together to form a plurality of first bi-molded plate assemblies 62 (FIGS. 7A-B).

Figure 7A:
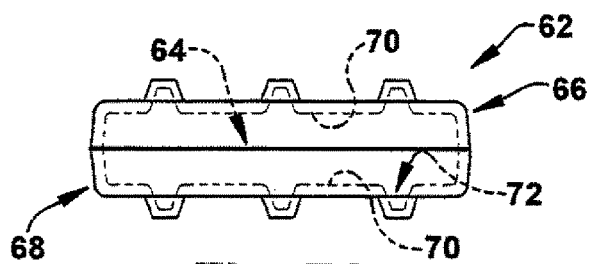
FIG. 7A is a perspective view of a first bi-molded plate assembly for forming the substantially baked insert in FIGS. 2A-D.
Figure 7B:
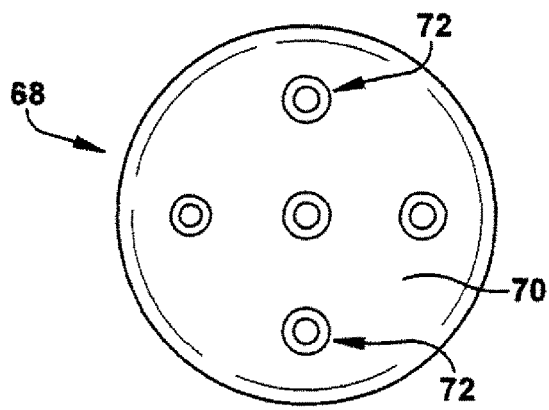
FIG. 7B is a top view of a second baking plate of the first bi-molded plate assembly in FIG. 7A.

As shown in FIGS. 7A-B, each of the first bi-molded plate assemblies 62 formed by each of the first baking plates 60 have a puck- or disc-shaped configuration and form a cavity 64 therebetween. The cavity 64 is defined by first and second plates 66 and 68. The dimensions (e.g., height, width, length, cavity depth, etc.) of the first and second plates 66 and 68 can be about equal so that the dimensions of the substantially baked insert 12 or 12' formed by the method 30 are also about equal. An inner surface 70 of each of the first and second plates 66 and 68 can include at least one depression 72 for forming the finger members 24. For example, each of the depressions 72 can have a dome-shaped configuration for producing finger members 24 having a configuration as shown in FIGS. 2A-D. It will be appreciated that the depressions 72 can have any configuration for forming finger members 24 with any corresponding desired configuration. All or only a portion of each of the first bi-molded plate assemblies 62 can be made of a rigid, heat-conductive material (e.g., a metal or metal alloy).

Figure 5:
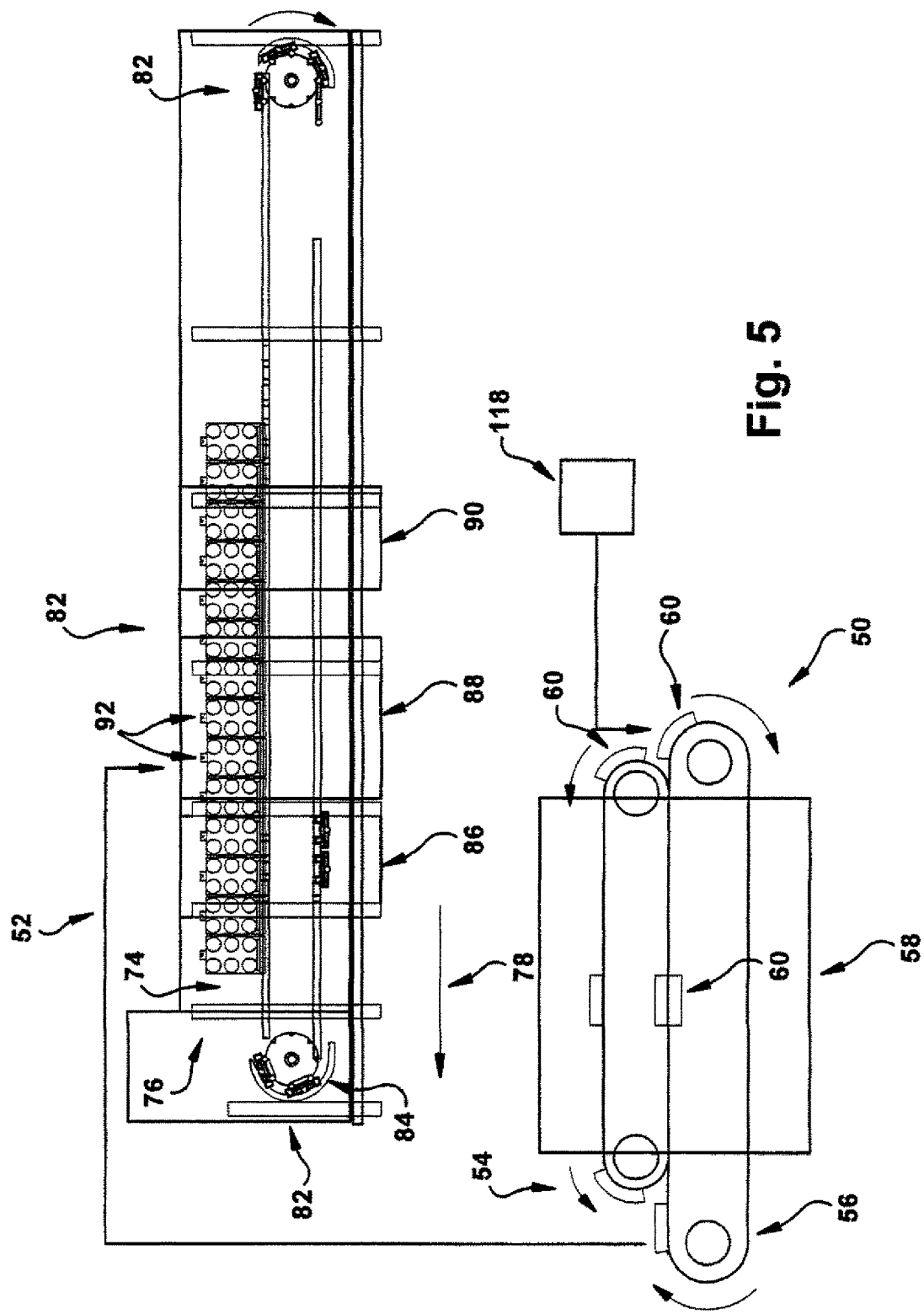
FIG. 5 is a schematic diagram showing an automated assembly line system used to form the multi-layered food product of the claimed subject matter.

As shown in FIG. 5, the second automated assembly line 52 is for preparing the multi-layered food product 10 or 10' and comprises a continuous, loop-shaped tract 74 having an upper portion 76 and a lower portion 78. A portion of the second assembly line 52 is seated within an oven 80. The tract 74 of the second assembly line 52 is operably mated to opposing rotation members 82, each of which is separately or jointly powered by a power source (not shown). As described in greater detail below, the second assembly line 52 also includes an automatic removing system 84, a first batter injector 86, an insert feeding system 88, and a second batter injector 90.

Figure 8A:
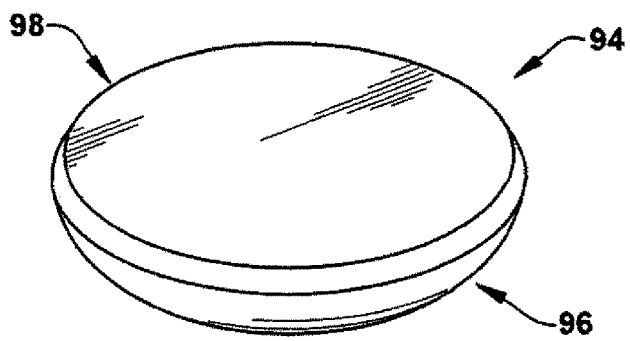
FIG. 8A is a perspective view of a second bi-molded plate assembly for forming the multi-layered food product in FIGS. 1A-2D, the second bi-molded plate assembly comprising a lid member and a receptacle member.
Figure 8B:
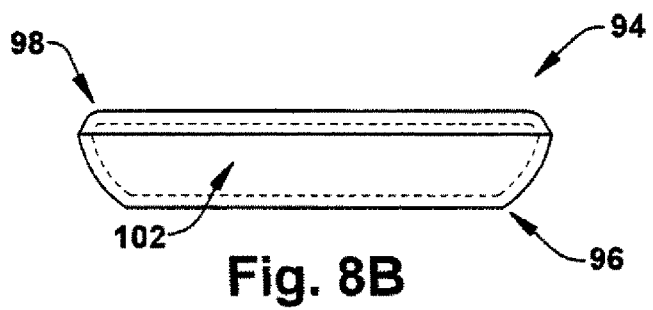
FIG. 8B is a side view of the second bi-molded plate assembly in FIG. 8A.

The second assembly line 52 also includes a plurality of second baking plates 92, each of which includes at least one of a second bi-molded plate assembly 94 (FIGS. 8A-B). As shown in FIG. 5, the second assembly line 52 includes fourteen second baking plates 92 having six of the second bi-molded plate assemblies 94 in each. It will be appreciated that the number of the second baking plates 92, as well as the number of the second bi-molded plate assemblies 94 comprising each of the second baking plates can be varied depending upon production needs and the configuration of the second assembly line 52.

Figure 9A:
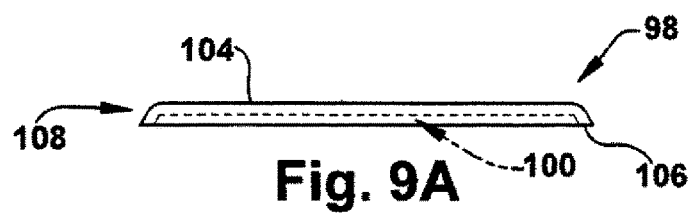
FIG. 9A is a side view of the lid member shown in FIG. 8A.
Figure 9B:
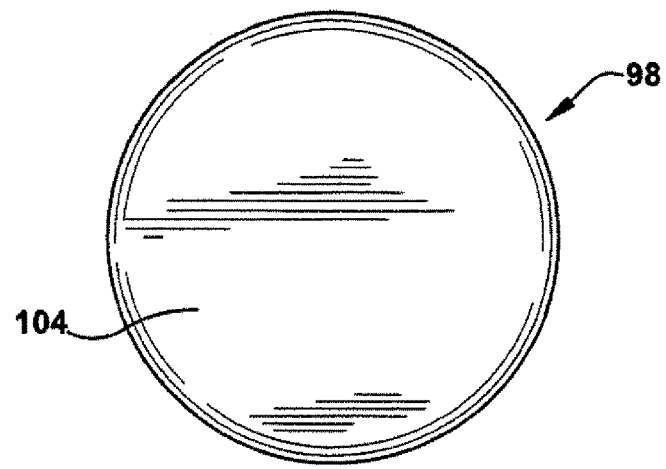
FIG. 9B is a top view of the lid member shown in FIG. 9A.
Figure 10A:
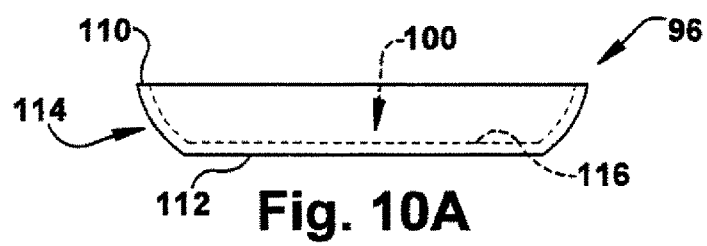
FIG. 10A is a side view of the receptacle member shown in FIG. 8A.

As shown in FIGS. 8A-B, the second bi-molded plate assemblies 94 comprises a receptacle member 96 and a lid member 98. All or only a portion of each of the second bi-molded plate assemblies 94 can be made of a rigid, heat-conductive material (e.g., a metal or metal alloy). The receptacle member 96 and the lid member 98 each have a generally circular or oval-shaped configuration and include a cavity 100 (FIGS. 9A and 10A). When the receptacle member 96 (FIG. 8B) and the lid member 98 are securely mated with one another, the cavities 100 of the lid member and the receptacle member form a molded baking cavity 102. The molded baking cavity 102 can have a diameter of about 6 cm to about 15 cm, and a depth of about 1 cm to about 5 cm.

The molded baking cavity 102 is designed to hold and bake the components of the multi-layered food product 10 or 10' concurrently. Accordingly, the flavor of the multi-layered food product 10 or 10' is enhanced through the process of baking the product components within the molded baking cavity 102. In addition to the leavening power that the multi-layered food product 10 or 10' receives from the yeast-leavened dough 18 and the chemically-leavened batter 14, the multi-layered food product receives further leavening from the steam generated within the sealed molded baking cavity 102 during the baking process.

The lid member 98 (FIG. 9A) of each of the second bi-molded plate assemblies 94 has a disc-like shape and is defined by oppositely disposed first and second major surfaces 104 and 106. The first major surface 104 has a generally smooth, flat configuration that gradually tapers around the edge 108 towards the second major surface 106. The second major surface 106 is adapted for mating with the receptacle member 96. As shown in FIG. 9A, the cavity 100 of the lid member 98 extends from the second major surface 106 towards the first major surface 104 such that the cavity is recessed within the second major surface. The cavity 100 of the lid member 98 defines a volume capable of holding between about 0% and about 40% of the multi-layered food product 10 or 10' during the baking process.

Figure 10B:
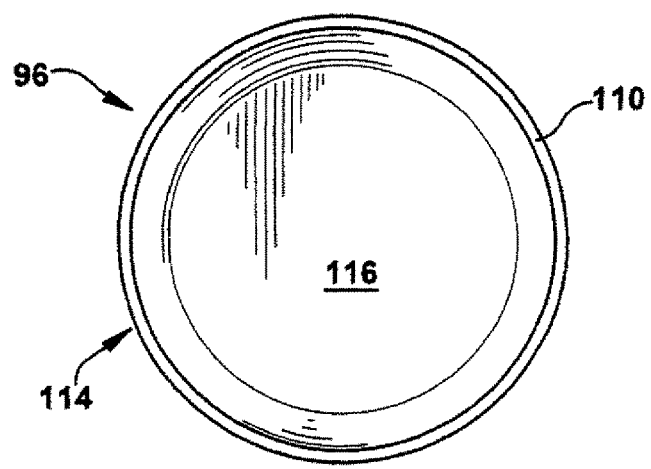
FIG. 10B is a top view of the receptacle member shown in FIG. 10A.

As shown in FIGS. 10A-B, the receptacle member 96 has a rounded, pan-shaped configuration. The receptacle member 96 includes oppositely disposed first and second major surfaces 110 and 112 and an annular side wall 114 that extends between the first and second major surfaces. The cavity 100 of the receptacle member 96 extends between the first major surface 110 and the bottom surface 116 of the receptacle member. The cavity 100 of the receptacle member 96 defines a volume that is greater than the volume of the lid member 98. The cavity 100 of the receptacle member 96 is capable of holding between about 60% and about 100% of the multi-layered food product 10 or 10' during the baking process.

It will be appreciated that one or more of the second bi-molded plate assemblies 94 can include an imprinting surface (not shown in detail) for imparting all or only a portion of a surface of the multi-layered food product 10 or 10' with a decorative design. For example, one or more surfaces defining the cavity 100 of the second bi-molded plate assembly 94 can include at least one depressed and/or raised imprinting surface having a decorative or aesthetically pleasing design. The imprinting surface may additionally or optionally serve to securely positioning the substantially baked insert 12 or 12' during baking. For example, the imprinting surface may assist in maintaining the substantially baked insert 12 or 12' proportionally in the center of the cavity 100 during baking.

At Act 32, the method 30 can begin by heating the first baking plates 60 to a predetermined temperature (e.g., about 250° F. to about 450 F.). Either prior to, contemporaneous with, or subsequent to Act 32, the raw components of the multi-layered food product 10 or 10' are prepared. For example, the yeast-leavened dough 18 can be formed by scaling (e.g., measuring out) the needed ingredients, which may include flour (e.g., about 27% to about 68% of the total batch weight), water (e.g., about 21% to about 57% of the total batch weight), milk powder (e.g., about 0% to about 9% of the total batch weight), eggs (e.g., about 2% to about 15% of the total batch weight), gluten (e.g., about 2% to about 5% of the total batch weight), sugar (e.g., about 2% to about 15% of the total batch weight), oil (e.g., about 0% to 15% of the total batch weight), yeast (e.g., about 1% to about 5% of the total batch weight), and salt (e.g., about 0.5% to about 2% of the total batch weight).

It will be appreciated that other ingredients may be added to adjust the flavor or improve the functionality of the yeast-leavened dough 18. Examples of ingredients that can be added to adjust the flavor of the yeast-leavened dough 18 can include butter, cheese, spices, natural flavorings, and fruit or nut inclusions. Examples of ingredients that may be added to improve the functionality of the yeast-leavened dough 18 can include baking enzymes, monoglycerides, fats and oils. After the ingredients are scaled, the ingredients are then mixed and kneaded together for a period of time sufficient to develop the gluten structure of the yeast-leavened dough 18. The fully developed, yeast-leavened dough 18 is then ready for subsequent use.

After preparing the yeast-leavened dough 18, a measured amount of one or more fillings 16 is "encrusted" inside a measured amount of the yeast-leavened dough to form the insert 12 or 12'. The measured amount of filling 16 may range from about 15 grams to about 99 grams, and the measured amount of the yeast-leavened dough 18 may range from 12 grams to about 128 grams. After the filling 16 is encrusted inside the yeast-leavened dough 18, the formed product comprises a ball-shaped insert 12 or 12' that is substantially or completely enveloped by the yeast-leavened dough and includes the filling at its center.

The insert 12 or 12' can be passed through a molding or shaping device (not shown) so that upper and/or lower portions of the insert are partially flattened. The molded insert 12 or 12' is placed into a bakery proofing chamber 118 (FIG. 5) for a period of time sufficient to adequately "rise" or "proof" the insert prior to baking. For example, the proofing time can vary from about 10 minutes to about 60 minutes, depending upon the type and size of the yeast-leavened dough 18 and the filling 16. After the insert 12 or 12' is adequately proofed, it is ready for subsequent use.

Either before, during, or after formation of the insert 12 or 12', the chemically-leavened batter layer 14 is prepared. Creation of the chemically-leavened batter layer 14 begins by scaling the necessary ingredients, which may include water (e.g., about 29% to about 68% of the total batch weight), flour (e.g., about 15% to about 40% of the total batch weight), eggs (e.g., about 5% to about 30% of the total batch weight), sugar (e.g., about 0% to about 17% of the total batch weight), milk powder (e.g., about 0% to about 12% of the total batch weight), oil (e.g., about 0% to about 15% of the total batch weight), baking powder (e.g., about 0.5% to about 5% of the total batch weight), baking soda (e.g., about 0% to about 2% of the total batch weight), and salt (e.g., about 0.5% to about 3% of the total batch weight).

It will be appreciated that other ingredients may be added to adjust the flavor or improve the functionality of the chemically-leavened batter layer 14. Examples of ingredients that may be added to adjust the flavor of the chemically-leavened batter layer 14 may include butter, cheese, meat, natural flavors or spices, fruits, nuts, and the like. Examples of ingredients that may be added to improve the functionality of the chemically-leavened batter layer 14 may include oils, fats, emulsifiers, and the like.

After scaling the desired ingredients, the ingredients are then thoroughly mixed until they are adequately combined into a partially liquid form, typically in a large temperature-controlled stirring vat (not shown). The mixed ingredients may then be transferred to a second batter mixer (not shown) where additional ingredients can be added (e.g., eggs), stirred at high speeds, and properly aerated. The resultant chemically-leavened batter layer 14 may then be placed inside a temperature-controlled container (e.g., first and second batter injectors 86 and 90) that will be used to deposit the chemically-leavened batter during the baking process.

Prior to, simultaneous with, or subsequent to preparation of the insert 12 or 12' and the chemically-leavened batter 14, the insert can be substantially baked at Act 34. As shown in FIG. 5, an insert 12 is taken from the proofing chamber 118 and deposited into a first baking plate 60 (e.g., the second plate 68 of a first bi-molded plate assembly 62). It will be appreciated that the insert 12 or 12' can be deposited into the first baking plate 60 by any one or combination of suitable mechanisms, such as via a robotic arm, conveyor belt system 140 (FIG. 6), or by hand. Once the insert 12 or 12' is deposited into the first baking plate 60, the baking plate rotates about the lower tract to securely mate with another baking plate, thereby forming a plurality of first bi-molded plate assemblies 62.

The baking plates 60 then move through an oven 58 (e.g., a tunnel oven) for a time and at a temperature sufficient to substantially bake the insert 12 or 12'. In some instances, the term "substantially baked" can mean that the insert 12 or 12' is baked about 80%, about 85%, about 90%, about 95% or 100% (completely baked). In other instances, the term "substantially baked" can mean par baked. In one example, par baked can mean baked less than 100% at a first time, and then subsequently completely baked at a different second time. In further instances, the term "substantially baked" can mean baked less than 100%, but more than 80%. For example, the first baking plates 60 can move through oven 58 so that the insert 12 or 12' is completely or 100% baked and, thus, free from liquid or moisture. For instance, the first baking plates 60 can move through oven 58 for a time of about 20 seconds to about 90 seconds and at a temperature of about 250° F. to about 450° F. to substantially or completely bake the insert 12 or 12'.

After the first baking plates 60 pass through the oven 58, the baking plates are separated as shown in FIG. 5 so that the substantially baked insert 12 or 12' can be removed from the plates and deposited into the insert feeding system 88. It will be appreciated that the substantially baked insert 12 or 12' produced by the method 30 can be deposited into the insert feeding system 88 by any one or combination of mechanisms, such as a transfer machine 142 (FIG. 6) that removes the substantially baked insert 12 or 12' from the first baking plates 60 and then passes the insert onto a conveyor belt system 140. Prior to depositing the substantially baked insert 12 or 12' into the insert feeding system 88, the second baking plates 92 (and thus each of the second bi-molded plate assemblies 94) are heated to a predetermined temperature (e.g., about 300° F. to about 450° F.) at Act 36. Upon heating each of the second bi-molded plate assemblies 94 to the predetermined temperature and forming the components of the multi-layered food product 10 or 10', the second assembly line 52 is activated so that the tract 74 progressively moves in a clock-wise motion at a predetermined rate.

At Act 38, the first batter injector 86 is operated to pour a first amount of the chemically-leavened batter layer 14 into the cavity 100 of each of the receptacle members 96. The first amount of the chemically-leavened batter layer 14 is delivered in an amount sufficient to cover at least a substantial portion of the bottom surface 116 of each of the receptacle members 96. The total amount of the chemically-leavened batter layer 14 that is poured into the receptacle members 96 can vary between about 10 grams and about 128 grams, depending upon the type of multi-layered food product 10 or 10' being made. It will be appreciated that a pan release agent (e.g., baking oil) can be applied to all or only a portion of the molded baking cavity 102 prior to the addition of the raw components to prevent or mitigate sticking.

At Act 40, the second baking plates 92 are advanced along the second assembly line 52 to the insert feeding system 88. The insert system 88 is then activated to place a substantially baked insert 12 or 12' atop the first amount of the chemically-leavened batter layer 14 already in each of the receptacle members 96. The substantially baked insert 12 or 12' is placed atop the first amount of the chemically-leavened batter layer 14 so that no portion of the insert comes into contact with each of the receptacle members 96. In other words, a substantially baked insert 12 or 12' is placed in each of the receptacle members 96 so that each insert is at least partially enveloped or encapsulated by the first amount of the chemically-leavened batter layer 14. The volume of each of the receptacle members 96 filled by the first amount of the chemically-leavened batter layer 14 and the substantially baked insert 12 or 12' can be from about 35% to about 75%.

As the second baking plates 92 continue to advance along the second assembly line 52, the second batter injector 90 is operated to pour a second amount of the chemically-leavened batter layer 14 into each of the receptacle members 96 (Act 42). The second amount of the chemically-leavened batter layer 14 is delivered in an amount sufficient to fill an additional 20% to about 65% of the cavity 100 of each of the receptacle members 96. Importantly, the second amount of the chemically-leavened batter layer 14 is poured into each of the receptacle members 96 such that each of the substantially baked inserts 12 or 12' is substantially or completely enveloped by the chemically-leavened batter layer.

At Act 44, each of the second bi-molded plate assemblies 94 is arranged to form the molded baking cavity 102. For example, the second major surface 106 of each of the lid members 98 is securely mated with the first major surface 110 of each of the receptacle members 96 to form a heated and sealed molded baking cavity 102. By "sealed" it is understood that the baking cavity 102 can include holes, vents, or other apertures that permit the release of steam from the baking cavity while preventing leakage of product components. It will be appreciated that Acts 36-44 of the method 30 plus a first baking period are conducted during a first period of time (Act 46), which is about 10% to about 40% of the total time required to bake the multi-layered food product 10 or 10'.

After assembling the molded baking cavities 102 and then baking for the first period of time, the second baking plates 92 are rotated about the rotation members 82 (indicated by arrows) so that the second bi-molded plate assemblies 94 is inverted (Act 120) (FIG. 11). Inverting the second bi-molded plate assemblies 94 allows the chemically-leavened batter layer 14 to distribute better within each of the molded baking cavities 102, while also facilitating more even baking throughout the multi-layered food product 10 or 10'. After inverting the second baking plates 92, the second baking plates are heated for a second period of time, which is greater than the first period of time (Act 122). For example, the second period of time can be about 60% to about 90% of the total time needed to bake the multi-layered food product 10 or 10'. By baking components (e.g., all of the components) of the multi-layered food product 10 under pressure and at a uniform temperature, the yeast-leavened dough 18 and the chemically-leavened batter layer 14 can be combined to form a substantially seamless, borderless product.

At Act 48 (FIG. 4), the automatic removing system 84 separates the lid member 98 and the receptacle member 96 of each of the second bi-molded plate assemblies 94 after the multi-layered food product 10 or 10' has been sufficiently baked. Since each of the receptacle members 96 is inverted, separation of the lid members 98 from the receptacle members allows the multi-layered food product 10 or 10' to be easily removed from the second bi-molded plate assemblies 94 via gravity. Alternatively, the multi-layer food product 10 or 10' can be removed by a suction mechanism (not shown) once the bi-molded plate assemblies 94 have rotated back around the rotation members 82 and the lid members 98 have opened. After removing the multi-layered food product 10 or 10' from each of the bi-molded plate assemblies 94, the multi-layered food product is cooled for an appropriate period of time before freezing, wrapping and packaging. The packaged, multi-layered food product 10 or 10' can be boxed and further frozen ahead of distribution to the marketplace.

As illustrated in FIG. 12, another aspect of the claimed subject matter includes a method 130 for forming a multi-layered food product 10". The method 130 is similar to the method 30 illustrated in FIG. 4. For example, the method 130 can be performed using an automated assembly line that is identical or similar to the first automated assembly line 50 described above. Additionally, the method 130 can be performed using bi-molded plate assemblies (not shown) that are similar to the first bi-molded plate assemblies 62 described above. For example, each of the receptacle members comprising the bi-molded plate assemblies can have a volume that is about the same as the volume of the lid members.

At Act 36, the method 130 can begin by heating the bi-molded plate assemblies to a predetermined temperature (e.g., about 300° F. to about 450° F.). Either prior to, contemporaneous with, or subsequent to Act 36, the raw components of the multi-layered food product 10" can be prepared. For example, the yeast-leavened dough 18 can be formed by scaling (e.g., measuring out) the needed ingredients (as described above). As also described above, it will be appreciated that other ingredients may be added to adjust the flavor or improve the functionality of the yeast-leavened dough 18.

After the ingredients are scaled, the ingredients can then be mixed and kneaded together for a period of time sufficient to develop the gluten structure of the yeast-leavened dough 18. Next, a measured amount of one or more fillings 16 can be "encrusted" inside a measured amount of the yeast-leavened dough 18 using a known bakery machining process. The measured amount of filling 16 may range from about 15 grams to about 99 grams, and the measured amount of the yeast-leavened dough 18 may range from 12 grams to about 128 grams. After the filling 16 is encrusted inside the yeast-leavened dough 18, the formed product comprises a ball-shaped insert 12" that is completely enveloped or encapsulated by the yeast-leavened dough and includes the filling at its center.

The insert 12" can be passed through a molding or shaping device (not shown) so that upper and lower portions of the insert are partially flattened. The molded insert 12" is then placed into a bakery proofing chamber 118 for a period of time sufficient to adequately "rise" or "proof" the insert prior to baking. For example, the proofing time can vary from about 10 minutes to about 60 minutes, depending upon the type and size of the yeast-leavened dough 18 and the filling 16. After the insert 12" is adequately proofed, it is ready for subsequent use.

Upon heating each of the bi-molded plate assemblies to the predetermined temperature and forming the raw components of the multi-layered food product 10", the insert 12" can be placed into a receptacle member of a bi-molded plate assembly (Act 132) and the lid member mated with the receptacle member to form a sealed baking cavity (Act 44).

Following formation of the sealed baking cavity, the insert 12" can be entirely baked at Act 46. As described above, an insert 12" is taken from the proofing chamber 118 and deposited into the receptacle member of a bi-molded plate assembly. It will be appreciated that the insert 12" can be deposited into the receptacle member by any one or combination of mechanisms known in the art, such as via a robotic arm, conveyor belt system 140 (FIG. 6), or by hand. Once the insert 12" is deposited into the receptacle member, the receptacle members and the lid members rotate about the tracts of an oven 58 (e.g., a tunnel oven) to securely mate with another and thereby form a plurality of bi-molded plate assemblies.

The bi-molded plate assemblies then move through the oven 58 for a time and at a temperature sufficient to completely bake the insert 12". For example, the bi-molded plate assemblies can move through oven 58 so that the insert 12" is baked to completion (100% baked). For instance, the first bi-molded plate assemblies can move through the oven 58 for a time of about 1 minute to about 4 minutes and at a temperature of about 300° F. to about 450° F. to completely bake the insert 12".

After the bi-molded plate assemblies pass through the oven 58, the receptacle members and the lid members are separated as shown in FIG. 5 so that the multi-layered food product 10" can be removed from the plates and cooled for an appropriate period of time before freezing, wrapping and packaging. The packaged, multi-layered food product 10" can be boxed and further frozen ahead of distribution to the marketplace.

Figure 13:
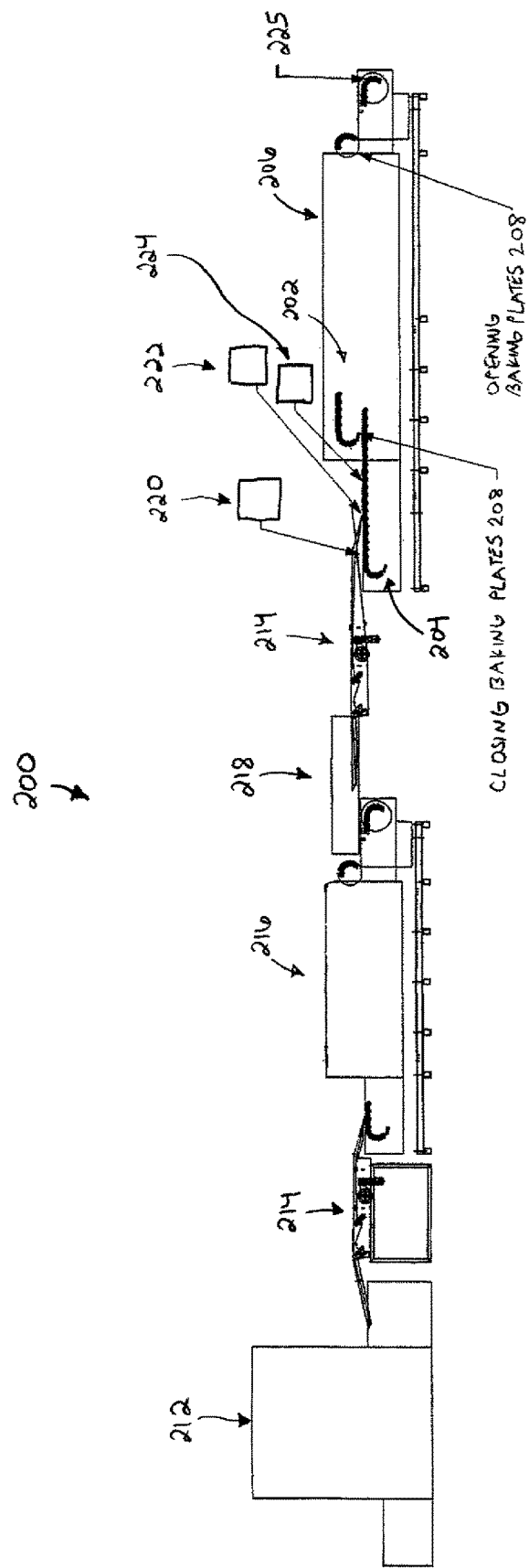
FIG. 13 is a schematic diagram showing an alternative configuration of the automated assembly line system in FIG. 6.

It will be appreciated that the claimed subject matter can include an alternative assembly line system 200 (FIG. 13) for forming a multi-layered food product 10 or 10'. As shown in FIG. 13, the assembly line system 200 includes a series of upper and lower loop-shaped tracts 202 and 204, a portion of each of which is disposed within an oven 206. The upper and lower tracts 202 and 204 include a plurality of baking plates 208 (not shown in detail) securely mounted thereto that can be mated together to form a plurality of bi-molded plate assemblies (not shown) (as described above). The lower tract 204 has a greater length than the upper tract 202, which allows the components of the multi-layered food product 10 or 10' to be supplied to the baking plates 208 as shown in FIG. 13. Other components of the assembly line system 200 are similar or identical to those shown in FIG. 6 and described above, such as a bakery proofing chamber 212, a conveyor belt system 214, a second oven 216, a transfer machine 218, a first batter injector 220, an insert feeding system 222, a second batter injector 224, and an optional automatic removing system 225. For example, the oven 206 is different than the oven 52 described above because there is no inversion or flipping of plates during operation.

In operation, the baking plates are heated to a predetermined temperature (as described above). The first batter injector 220 is operated to pour a first amount of a chemically-leavened batter layer 14 into each of the baking plates 208. The baking plates 208 are then advanced along the lower tract 204 (e.g., clockwise) to the insert feeding system 222, which is activated to place a substantially baked insert 12 or 12' atop the first amount of the chemically-leavened batter layer 14 already in each of the baking plates 208. As the baking plates 208 continue to advance along the lower tract 204, the second batter injector 224 is operated to pour a second amount of the chemically-leavened batter layer 14 into each of the baking plates (as described above). Once the second amount of the chemically-leavened batter layer 14 is deposited into each of the baking plates 208, the baking plates of the upper tract 202 rotate (e.g., counter-clockwise) to securely mate with the baking plates of the lower tract 204, thereby forming the plurality of bi-molded plate assemblies.

Next, the bi-molded plate assemblies move through the oven 206 for a time and at a temperature sufficient to substantially or completely bake the multi-layered food product 10 or 10' (as described above). The total bake time is about 30 seconds to about 200 seconds. After the bi-molded plate assemblies pass through the oven 206, the baking plates of the lower and upper tracts 204 and 202 are separated so that the substantially or completely baked multi-layered food product 10 or 10' is removed from each of the bi-molded plate assemblies (e.g., by gravity or the automatic removing system 225) and cooled for an appropriate period of time before freezing, wrapping and packaging. The packaged, multi-layered food product 10 or 10' can be boxed and further frozen ahead of distribution to the marketplace.

From the above description of the invention, those skilled in the art will perceive improvements, changes and modifications. For example, it should be appreciated that the methods described herein comprise a series of acts that may be performed in any sequence, or a subset of acts having any sequence, to obtain the product. Such improvements, changes, and modifications are within the skill of the art and are intended to be covered by the appended claims.

Having described the invention, the following is claimed:

1. A multi-layered food product comprising: a proofed and baked yeast-leavened dough layer that encapsulates a filling, said proofed and baked yeast-leavened dough includes yeast, said yeast-leavened dough layer providing structural integrity to said food product to facilitate in eating said food product using a hand; said filling ranges from about 15 grams to about 99 grams; and
a baked chemically-leavened batter layer that encapsulates the proofed and baked yeast leavened dough, said chemically-leavened batter layer forming a soft cake or quick bread-like layer over said yeast-leavened dough layer, said baked chemically-leavened batter includes chemical leavening agent, said chemically-leavened batter prior to being baked is a pourable batter;
wherein said baked chemically-leavened batter layer has a different ingredient composition from said yeast-leavened dough, said filling has a different composition from said baked chemically-leavened batter layer and said yeast-leavened dough, and,
wherein said yeast-leavened dough has been proofed and baked prior to said baked chemically-leavened batter layer encapsulating said proofed and baked yeast-leavened dough.

2. The multi-layered food product of claim 1, wherein the weight percentage (wt-%) of said filling is about 15% to about 60% of the total weight of said multi-layered food product.

3. The multi-layered food product of claim 1, wherein the wt-% of said yeast-leavened dough is about 10% to about 60% of the total weight of said multi-layered food product.

4. The multi-layered food product of claim 1, wherein the wt-% of said chemically-leavened batter layer is about 15% to about 60% of the total weight of said multi-layered food product.

5. The multi-layered food product of claim 1, wherein at least a portion of an outer surface of said multi-layered food product includes a decorative design.

6. The multi-layered food product of claim 1, having a puck-shaped configuration.

7. The multi-layered food product of claim 1 being configured for insertion into a toaster having at least one square-shaped or rectangular actuatable toasting slot.

8. The multi-layered food product of claim 1, wherein eggs comprise about 5% to about 30% of the total batch weight of the chemically-leavened batter layer.

9. The multi-layered food product of claim 8, wherein eggs comprise about 2% to about 15% of the total batch weight of the yeast-leavened dough.

10. The multi-layered food product of claim 1, wherein the chemically-leavened batter prior to baking includes 29-68 wt. % water, 15-40 wt. % flour, up to 30 wt. % egg, 0-17 wt. % sugar, 0-12 wt. % milk powder, 0-15 wt. % oil, 0.5-7 wt. % chemical leavening agent, and 0.5-3 wt. % salt.

11. A multi-layered food product comprising:
a filling;
a yeast-leavened dough layer that is formed of yeast-leavened dough that has been proofed and baked, said yeast-leavened dough layer at least partially encapsulating said filling, said yeast-leavened dough includes yeast, said yeast-leavened dough layer providing structural integrity to said food product to facilitate in eating said food product using a hand; and,
a chemically-leavened batter layer that is formed of chemically-leavened batter that has been baked, said chemically-leavened batter layer at least partially encapsulating said yeast leavened dough layer, said chemically-leavened batter includes chemical-leavening agent, said chemically-leavened batter prior to being baked is a pourable batter that includes 29-68 wt. water, 15-40 wt. % flour, up to 30 wt. % egg, 0-17 wt. % sugar, 0-12 wt. % milk powder, 0-15 wt. % oil, 0.5-7 wt. % chemical leavening agent, and 0.5-3 wt. % salt, said chemically-leavened batter layer forming a soft cake or quick bread-like layer over said yeast-leavened dough layer;
wherein said chemically-leavened batter has a different ingredient composition from said yeast-leavened dough, said filling has a different composition from said chemically-leavened batter and said yeast-leavened dough, and,
wherein said yeast-leavened dough of said yeast-leavened dough layer has been proofed and baked while said filling is at least partially encapsulated in said yeast-leavened dough layer, and,
wherein said yeast-leavened dough of said yeast-leavened dough layer has been proofed and baked prior to a) said chemically-leavened batter layer encapsulating said yeast-leavened dough layer, and b) said chemically-leavened batter of said chemically-leavened batter layer being baked.

12. The multi-layered food product as defined in claim 11, wherein said yeast-leavened dough layer fully encapsulates said filling, said chemically-leavened batter layer fully encapsulates said yeast-leavened dough layer.

13. The multi-layered food product as defined in claim 11, wherein said yeast-leavened dough layer includes a plurality of finger members that project outwardly from an outer surface of said yeast-leavened dough layer, said plurality of finger members configured to facilitate in securing said chemically-leavened batter layer to said yeast-leavened dough layer, said plurality of finger members not extending beyond an outermost surface of said chemically-leavened batter layer.

14. The multi-layered food product as defined in claim 11, wherein said yeast-leavened dough is absent chemical leavening agent and said chemically-leavened batter is absent yeast.

15. The multi-layered food product as defined in claim 13, wherein said yeast-leavened dough is absent chemical leavening agent and said chemically-leavened batter is absent yeast.

16. A frozen wrapped food product comprising:
a frozen multi-layered food product that includes:
a filling;
a yeast-leavened dough layer that is formed of yeast-leavened dough that has been proofed and baked, said yeast-leavened dough layer encapsulating said filling, said yeast-leavened dough includes yeast, said yeast-leavened dough layer providing structural integrity to said food product to facilitate in eating said food product using a hand; and, a chemically-leavened batter layer that is formed of chemically-leavened batter that has been baked, said chemically-leavened batter layer encapsulating said yeast leavened dough layer, said chemically-leavened batter prior to being baked is a pourable batter that includes 29-68 wt. % water, 15-40 wt. % flour, up to 30 wt. % egg, 0-17 wt. % sugar, 0-12 wt. % milk powder, 0-15 wt. % oil, 0.5-7 wt. % chemical leavening agent, and 0.5-3 wt. % salt, said chemically-leavened batter layer forming a soft cake or quick bread-like layer over said yeast-leavened dough layer when in a non-frozen state;

wherein said chemically-leavened batter has a different ingredient composition from said yeast-leavened dough, said filling has a different composition from said chemically-leavened batter and said yeast-leavened dough, and, wherein said yeast-leavened dough of said yeast-leavened dough layer has been proofed and baked while said filling is at least partially encapsulated in said yeast-leavened dough layer, and, wherein said yeast-leavened dough of said yeast-leavened dough layer has been proofed and baked prior to a) said chemically-leavened batter layer encapsulating said yeast-leavened dough layer, and b) said chemically-leavened batter of said chemically-leavened batter layer being baked; and, a wrapping that wraps said frozen multi-layered food product.

17. The multi-layered food product as defined in claim 16, wherein said yeast-leavened dough layer includes a plurality of finger members that project outwardly from an outer surface of said yeast-leavened dough layer, said plurality of finger members configured to facilitate in securing said chemically-leavened batter layer to said yeast-leavened dough layer, said plurality of finger members not extending beyond an outermost surface of said chemically-leavened batter layer.

* * * * *